Oct. 27, 1936.  J. S. REID  2,058,912
RASP
Filed Sept. 26, 1934

INVENTOR
JAMES S. REID
ATTORNEYS

Patented Oct. 27, 1936

2,058,912

UNITED STATES PATENT OFFICE 2,058,912

RASP

James S. Reid, Shaker Heights, Ohio, assignor, by mesne assignments, to The Standard Products Company, Cleveland, Ohio, a corporation of Ohio Application September 26, 1934, Serial No. 745,494

4 Claims. (Cl. 29—78)

This invention relates to a metal-working tool of the nature of a file or rasp and particularly, to a tool of this nature which removes metal quickly and disposes of it so that the operating elements of the tool are not clogged by the removed metal.

In dressing down sheet metal parts and the like, it is often desired to remove soft or relatively soft metals, including solder and lead, which come off in relatively large particles and, being soft, tend to clog up the cutting elements of the abrading device. It may also be desired to work down the surfaces of non-metallic materials, such as glue, bakelite, and the like, which also quickly load up the cutting surfaces of the tool or abradant. With ordinary abrading devices, the cutting edges are quickly loaded by the removed metal which fills in the spaces between the cutting edges and prevents them from further engaging the work.

To avoid this difficulty, it is an object of the present invention to provide a tool having means for passing the abraded or severed metal away from the work and tool as fast as it is generated.

Another object of the invention is to provide a flexible file or rasp which is adapted to rapidly remove relatively soft metal or other soft materials from a surface without affecting the efficiency of the tool.

Figure 1:
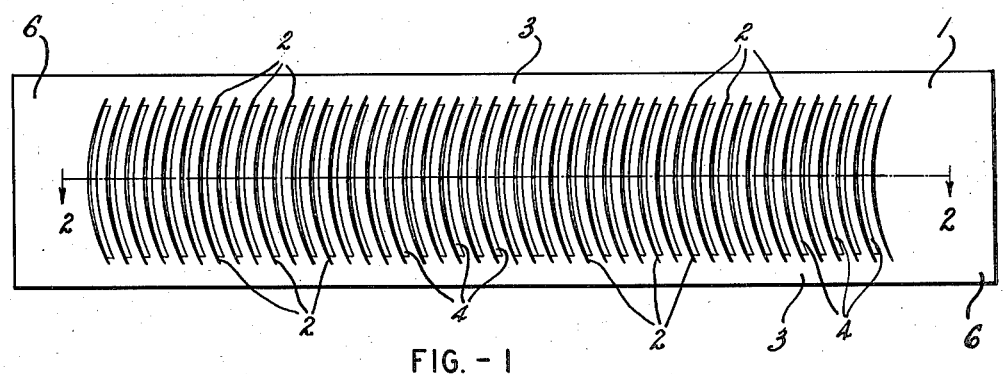
Figure 2:
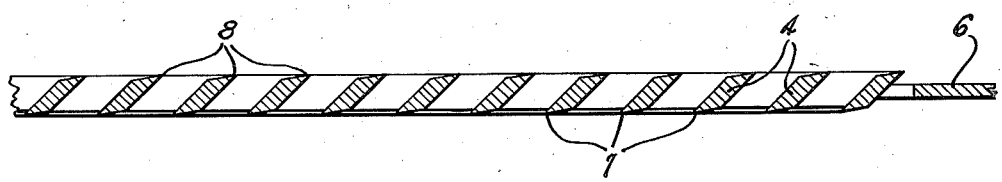
Figure 3:
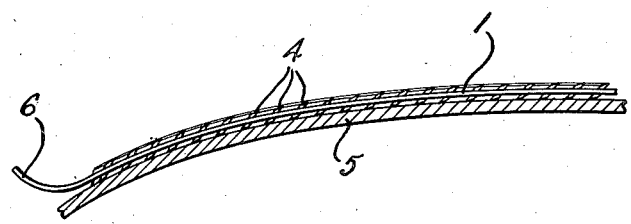

The accompanying drawing forming part of the specification illustrates one embodiment of the invention. In the drawing, Fig. 1 is a plan view of a tool constructed in accordance with the principles of the invention; Fig. 2 is an enlarged section taken along the line 2—2 of Fig. 1; and Fig. 3 is a section illustrating the tool as applied to a surface to be treated.

Referring to Figs. 1 and 2 of the drawing, a band 1 of sheet metal, preferably steel, although other suitable metals may be used, is pierced across its width by a series of slots or passages 2 which extend across a portion of the width of the band so as to leave side margins 3. These slots extend entirely through the metal of the band from one side to the other so that it is possible to see through the tool. Alternating with these slots are cutting blades 4 which are inclined at an angle to the plane of the band 1 and may present cutting edges on one or both sides of the tool. As shown in the drawing, these blades are arcuate or curved in shape so that the rasp will exert a slicing action on the surface of the work due to the fact that one portion of the blade is in advance of another portion thereof so that the cutting edge is, in effect, drawn across the work as the tool is applied. Of course, other shapes may be given to the cutting elements which may, for example, run straight across the width of the tool, without departing from the scope of the invention.

Both faces of the tool may be supplied with these cutting edges so that a working stroke may be performed in one direction, the tool turned over, and a working stroke then given in the reverse direction. Under all circumstances, the metal removed will be ejected through the slots 2 and will be effectively removed from the zone of operations so as not to clog the action of the tool.

The tool constituting the present invention may be manufactured by making arcuate cuts in parallel arrangement in a band of metal, these cuts extending generally transversely of the band from a point adjacent one longitudinal edge thereof to a point adjacent the other longitudinal edge leaving continuous marginal portions along each edge of the band so as to form strips attached at either end to the body of the band. These strips comprising all of the metal between adjacent cuts are then given a twist so that they lie at an angle to the plane of the band and leave angularly disposed slots between them. The edges of the strips may then be sharpened on one or both sides by bending the band, where a flexible metal is used, around a grinding wheel. This provides cutting edges on the strips which all lie in a continuous curve when the tool is bent to the same form which it occupied on the grinding wheel. At any lesser curve, the cutting edges project up from the surface of the tool so as to engage the work in an effective manner.

Preferably, the tool is made of flexible stock so that it can be applied to curved surfaces as ordinarily encountered. In Fig. 3, there is illustrated the manner of application of the tool to a curved piece of work 5. It will be seen that the tool may be grasped by the end portions 6, constituting handles, and bent to conform to the work surface. The cutting edges 7 then engage the work in one direction and the cutting edges 8, on the opposite side of the tool, may be made to engage the work in the opposite direction on the return stroke by turning the tool over. Due to the open disposition of the teeth or blades of the rasp, relatively soft metal and other soft materials may be roughed off quickly where it is desired to remove a large quantity of material rapidly in preparation for a finishing operation. At the same time, the slots or passages 2 permit this material to be removed quickly from the working zone so that the large quantities of removed metal or other material do not have an opportunity to interfere with the further cutting or abrading action of the tool. Such quick removal of large quantities of soft materials would not be possible if these slots were not provided for the disposal of the detached particles of material since these would quickly load up the cutting edges of any tool or abradant which presented a continuous surface below the cutting edges.

While the invention, in its preferred embodiment, embodies a tool which is flexible and is equipped with curved or arcuate cutting edges separated by slots for the disposition of loose material, it also embodies a tool which may not be flexible but which has arcuate cutting edges disposed at an angle to the plane of the tool and separated by slots into which severed material is directed by the inclined arcuate teeth or blades. The invention also properly embodies a tool which is flexible and is provided with teeth or blades which may not be arcuate and which may not be disposed at an angle to the plane of the tool, provided only that the cutting edges of such flexible tool are associated with slots extending through the thickness of the tool for the disposal of abraded material coming from the work.

What I claim is:

1. A rasp comprising a strip of sheet metal having a series of parallel slots cut partly across said strip, the metal portions between said slots being bent into parallel planes at an angle to the general plane of the strip to present the edges of said bent portions above the plane of the original strip, and said edges being sharpened.

2. A rasp comprising an elongated strip of flexible sheet metal having a series of closely spaced parallel slots cut partly across said strip, said slots extending generally transversely of said strip and having one portion of the slot in advance of other portions thereof, and the metal portions between said slots being bent into parallel planes at an angle to the general plane of the strip.

3. A rasp consisting of an elongated strip of flexible sheet metal having a series of closely spaced parallel slots cut generally transversely of said strip from a point adjacent one longitudinal edge to a point adjacent the other longitudinal edge thereof leaving continuous marginal portions along each edge of the strip, the metal portions comprising all of the metal between adjacent slots being bent into parallel planes at an angle to the general plane of the strip to present the edges of said bent portions above the plane of the original strip, and said last named edges being sharpened.

4. A rasp comprising a sheet metal member adapted to be presented to a piece of work in a certain path along its surface, there being a series of spaced slots cut through said member in direction generally transversely of said path, there being continuous portions of the metal of the member at the ends of said slots, substantially all of the metal constituting the portions between said slots being bent at an angle to the general plane of said sheet metal member to present the edges of said bent portions above the plane of the original strip, and said edges being sharpened.

JAMES S. REID.